United States Patent [19]

Tsuchiya et al.

[11] Patent Number: 5,405,154
[45] Date of Patent: Apr. 11, 1995

[54] PISTON RING

[75] Inventors: Takeshi Tsuchiya; Shuji Sameshima; Yoshio Onodera; Satoshi Kawashima, all of Yono, Japan

[73] Assignee: Nippon Piston Ring Co., Ltd., Japan

[21] Appl. No.: 893,847

[22] Filed: Jun. 4, 1992

[30] Foreign Application Priority Data

Jun. 7, 1991 [JP] Japan ............... 3-136728

[51] Int. Cl.6 ............................... F16J 9/00
[52] U.S. Cl. ............... 277/235 A; 277/236; 29/888.074; 29/888.075
[58] Field of Search ............ 277/234, 235 A, 235 R, 277/236, DIG. 6; 29/888.074, 888.075

[56] References Cited

U.S. PATENT DOCUMENTS

| | | | |
|---|---|---|---|
| 1,435,592 | 11/1922 | Doan et al. | 29/888.074 |
| 1,783,047 | 11/1930 | Marshall | 29/888.075 X |
| 2,380,654 | 7/1945 | Lane et al. | 29/888.074 |
| 4,557,492 | 12/1985 | Tsuchiya et al. | 277/235 A X |
| 4,570,946 | 2/1986 | Tsuchiya et al. | 277/235 A X |
| 4,579,355 | 4/1986 | Kooroki | 277/235 A X |

FOREIGN PATENT DOCUMENTS

| | | | |
|---|---|---|---|
| 2406420 | 8/1974 | Germany | 277/235 A |
| 280960 | 11/1988 | Japan | 277/235 A |
| 41649 | 2/1989 | Japan | 277/235 A |
| 85569 | 3/1990 | Japan | 277/235 R |
| 2-134468 | 5/1990 | Japan | 277/235 A |
| 37477 | 2/1991 | Japan | 277/235 A |
| 3-204479 | 9/1991 | Japan | |

*Primary Examiner*—William A. Cuchlinski, Jr.
*Assistant Examiner*—Scott W. Cummings
*Attorney, Agent, or Firm*—Parkhurst, Wendel & Rossi

[57] ABSTRACT

A compression ring as a piston ring adapted to by received in an annular groove formed in a piston disposed in a cylinder assembly of an internal combustion engine includes an annular ring base member having a cutout portion, the ring base member having an outer sliding surface, upper and lower surfaces continuous to the sliding surface through corner portions and an inner peripheral surface to be fitted to the piston groove, the sliding surface contacting an inner wall of the cylinder when the piston reciprocates therein. A nitriding layer is formed on all the surfaces of the ring base member by a nitriding treatment. A white portion of the nitriding layer formed only on the sliding surface of the ring base member is substantially completely removed and white portions of the nitriding layer formed on the first and second surfaces and corner portions between the sliding surface and the upper and lower surfaces are removed so as to reduce thicknesses thereof to not more than 5 μm.

8 Claims, 2 Drawing Sheets

PISTON RING

BACKGROUND OF THE INVENTION

This invention relates to a piston ring adapted for a piston disposed in an internal combustion engine, and more particularly, to a compression ring made of steel material adapted for such a piston.

Usually, in an internal combustion engine, there is disposed a piston cylinder assembly having a piston provided with a plurality of annular piston grooves formed on the outer periphery thereof, and piston rings including a compression ring and an oil ring are fitted into these piston grooves so that sliding surfaces of the piston rings contact slidingly the inner wall of the cylinder when the piston reciprocates therein.

Recently, in accordance with social needs, there have been developed high performance internal combustion engines capable of high revolutions and having high power or high compression ratio, including superchargers. Hence, it is required to provide piston rings to be utilized for such internal combustion engines having improved structures and grades. Further, in one aspect, it is recommended to use unleaded fuel from a viewpoint of environmental pollution, but lead including fuel has yet been used relatively widely in various countries. The interior of a piston cylinder assembly of the internal combustion engine which utilizes the lead containing fuel is strongly dominated by corrosive atmosphere or environment such as HCl or $H_2SO_4$. In order to suppress as much as possible abrasion of the piston ring caused by the corrosive environment, piston rings having sliding surfaces subjected to a nitriding treatment have been developed to provide anti-abrasion and anti-corrosion properties to the sliding surfaces of the piston rings. However, when the piston ring subjected to the nitriding treatment is used for the piston cylinder assembly of a high performance internal combustion engine power use, it is required for the piston ring to have anti-breaking property.

In a conventional compression ring as a piston ring for an internal combustion engine, the piston ring is composed of a steel base member having a surface on which is formed a nitriding layer by the nitriding treatment. In accordance with such nitriding treatment, a compound layer, called white layer hereafter, in a porous form, having very hard and brittle property is formed on a surface portion of the nitriding layer, and only the porous white layer formed on the sliding surface of the piston ring is removed by an after-treatment. In such a manner, a piston ring is manufactured as a product. Accordingly, the hard and brittle porous white layer remains on corner portions or upper and lower surface portions including corner portions of the base member of the thus produced product.

There is known a material of the base member having a composition of, for example, in weight %, C: 0.85 to 0.95, Si: 0.35 to 0.50, Mn: 0.25 to 0.40, Cr: 17.00 to 18.00, Mo: 1.00 to 1.25, V: 0.08 to 0.15, and a balance of Fe and inevitable impurity, or a composition of, for example, in weight %, C: 0.87 to 0.93, Si: 0.20 to 0.40, Mn: 0.20 to 0.40, Cr: 21.00 to 22.00, Mo: 0.20 to 0.40, Ni: 0.90 to 1.10, and a balance of Fe and inevitable impurity.

When the compression ring of the type described above is used by fitting the same into a piston groove formed to the piston of the internal combustion engine, the compression ring will repeatedly collide with the piston groove by contracting or expanding motions in the radial direction of the piston ring and the vertical motions in the axial direction thereof. During such motions, if the porous, hard and brittle white layers remain at the corner portions or near the corner portions of the base member of the compression ring, cracks will be formed at those portions. The cracks then progress and finally may result in the breaking of the compression ring.

SUMMARY OF THE INVENTION

An object of this invention is to substantially eliminate defects or drawbacks encountered in the prior art and to provide a piston ring adapted to a piston of an internal combustion engine having a structure improved in its fatigue strength.

This and other objects can be achieved according to this invention by providing a piston ring adapted to an annular groove formed to a piston disposed in a cylinder assembly of an internal combustion engine, the piston ring comprising:

an annular ring base member having a cutout portion, the ring base member having an outer sliding surface, first and second surfaces continuous to the sliding surface through corner portions and an inner peripheral surface to be fitted to the piston groove, the sliding surface contacting an inner wall of the cylinder when the piston reciprocates therein; and a nitriding layer formed on all the surfaces of the ring base member by a nitriding treatment, wherein a portion of nitriding layer formed only on the sliding surface of the ring base member is substantially completely removed and portions of the nitriding layer formed on the first and second surfaces and the corner portions between the sliding surface and the first and second surfaces are removed so as to reduce thicknesses of the nitriding layer portions formed thereon to about 5 μm or less.

In a preferred embodiment, the nitriding layer is removed by dipping the ring base member provided with the nitriding layer into an acid solution of low density or by a mechanical grinding method.

The piston ring according to this invention is preferably utilized as a compression ring.

In the prior art, the thickness of the nitriding layers formed on the upper and lower surfaces and the corner portions between the sliding surface and these surfaces of the ring base member are of about 20 μm, and hence, when any impact is applied to these nitriding layers, cracks are liably caused, which may result in the breaking of the piston ring itself. However, according to the present invention, the thicknesses of the nitriding layers formed on the upper and lower surfaces and the corner portions between the sliding surface and these surfaces of the ring base member are reduced to 5 μm or less, so that the tenacity of the nitriding layer itself can be improved and even if a crack is caused, the crack does not extend deeply, thus minimizing damage to the fatigue strength of the piston ring.

BRIEF DESCRIPTION OF THE DRAWINGS

For a better understanding of this invention and to show how the same is carried out, reference is first made, by way of a preferred embodiment, to the accompanying drawings, in which.

DESCRIPTION OF THE PREFERRED EMBODIMENT

Figure 1:
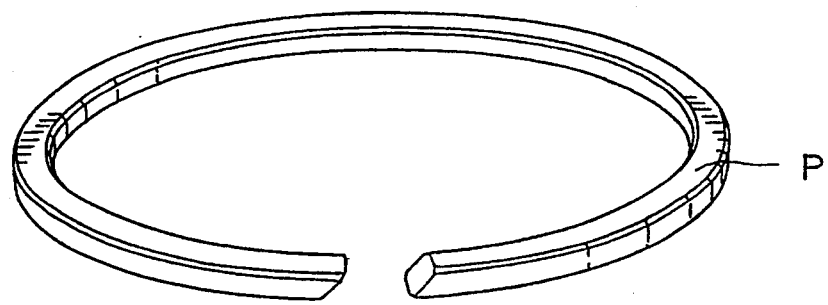
FIG. 1 is a perspective view of a compression ring as a piston ring to which this invention is applicable.
Figure 2:
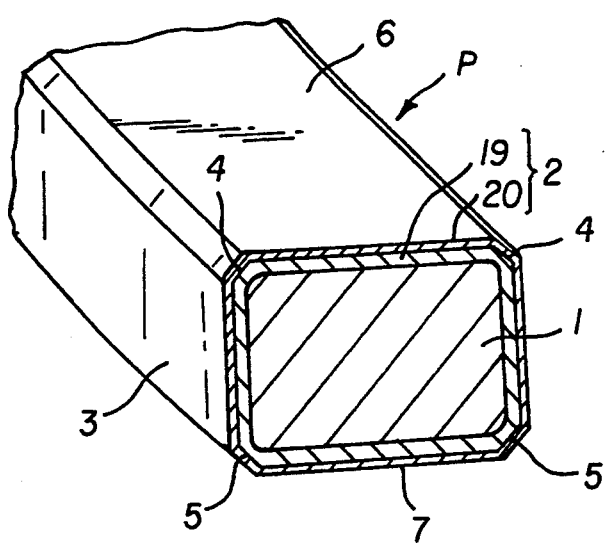
FIG. 2 is a perspective view showing a cross section of the compression ring shown in FIG. 1 after a nitriding treatment is effected to a base member of the ring.

FIG. 1 shows a perspective view of a piston ring P as a compression ring to which this invention is applied. The piston ring P is made of steel material and has an annular outer appearance including a cutout portion. The piston ring P may have various cross-sectional shapes such as that shown in FIG. 2, for example. In the example of FIG. 2, the piston ring P is composed of a base member 1 made of steel. Base member 1 has substantially a rectangular cross section having four corner portions 4 and 5 which are chamfered. The piston ring P has an outer surface on which is formed a nitriding layer 2 by the nitriding treatment, thereby providing upper, lower and side surfaces 6, 7 and 3, respectively. Nitriding layer 2 is made up of diffusion layer 19 (discussed below) and white layer 20. In accordance with such nitriding treatment, a white layer 20 described hereinbefore, in a porous form, having very hard and brittle property is formed on a surface portion of diffusion layer 19. The side surface 3 acts as a sliding surface.

Figure 3:
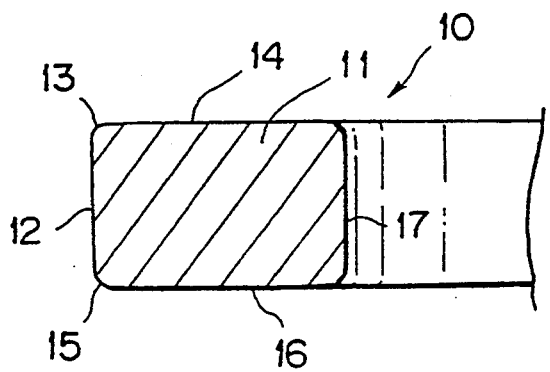
FIG. 3 is a sectional view of the base member of the ring before the nitriding treatment.

FIG. 3 shows a cross section of a piston ring as a compression ring 10 before the nitriding treatment. Referring to FIG. 3, the piston ring is composed of a base member 11 made of stainless steel such as SUS420J$_2$, and the base member 11 has an outer peripheral surface acting as a sliding surface 12 in contact with an inner wall of a cylinder of an internal combustion engine when the piston ring 10 is applied to the piston groove of the piston. The base member 11 further has an upper surface 14 as a first surface continuous to the sliding surface 12 through a corner portion 13, a lower surface 16 as a second surface continuous to the sliding surface 12 through a corner portion 15, and an inner peripheral surface 17 facing the piston groove when the piston ring 10 is fitted thereinto.

The condition that the surface of the base member 11 is treated with nitrogen is shown in FIG. 2, and this condition will be described in detail hereunder with reference to FIGS. 4 to 6 according to this invention. Nitriding treatment or soft nitriding treatment may be utilized for this treatment.

Figure 4:
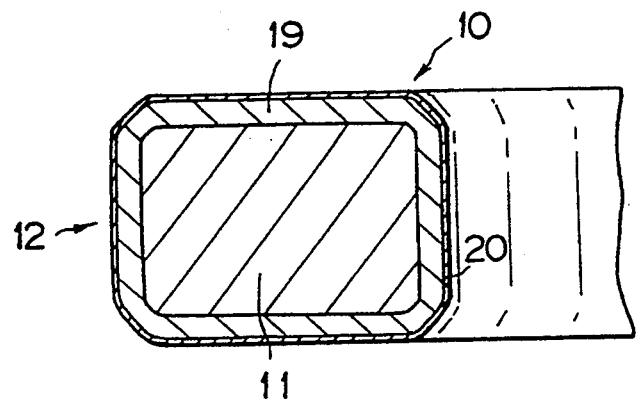
FIG. 4 is a view similar to that of FIG. 2 but related to FIG. 3.

As shown in FIG. 4, according to such nitriding treatment, a nitriding layer is formed on the entire outer surface of the base member 11 and a so-called white layer 20 (compound layer), which is observed as having a white color through an optical microscope, is formed on the outermost surface of the nitriding layer when the nitriding treatment has been applied. The white layer 20 is porous and has a very hard and brittle property, and a diffusion layer 19 is further formed between the base member 11 and the white layer 20. Within the white layer 20 and the diffusion layer 19 there exists compound formed by combining nitrogen with Fe, Cr and the like, but the nitrogen is gradually diffused from the outer surface towards the inside, so that the density of the nitrogen is gradually reduced towards the inside of the layer.

Figure 5:
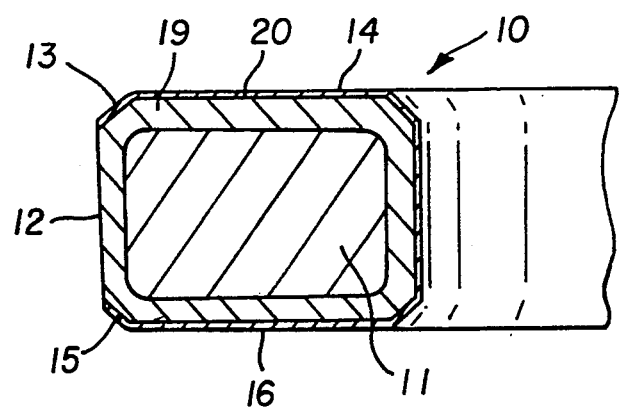
FIG. 5 is a sectional view of the base member in which a white layer formed by the nitriding treatment is completely removed only from a sliding surface of the compression ring of FIG. 4 and removed from the upper and lower surfaces and the corner portions of the compression ring so as to reduce thickness of the white layer portions formed thereon to about 5 μm or less.

As shown in FIG. 5, according to the present invention, the white layer 20 formed on the sliding surface 12 is removed by a mechanical procedure to expose the diffusion layer 19 having a hardness more than a predetermined hardness, and the thickness of the white layers 20 formed on the upper and lower surfaces 14 and 16 and the corner portions 13 and 15 are reduced by the mechanical procedure to thickness of less than 5 μm including 0 μm. In the prior art compression ring in which the white layer has a thickness of about 20 μm, as the white layer collides repeatedly with the piston groove at the time when the piston ring 10 contracts or expands in the radial direction or moves vertically in the axial direction, there is a fear of causing cracks on the remaining white layer by such repeated collisions, and there is also a fear of causing an abnormal abrasion to the piston ring and an objective member due to abrasion powders formed by the fallen white layer. Such fears can be eliminated by reducing the thickness of the white layer to less than 5 μm, which will be evidenced by way of the experiments described hereinbelow.

Figure 6:
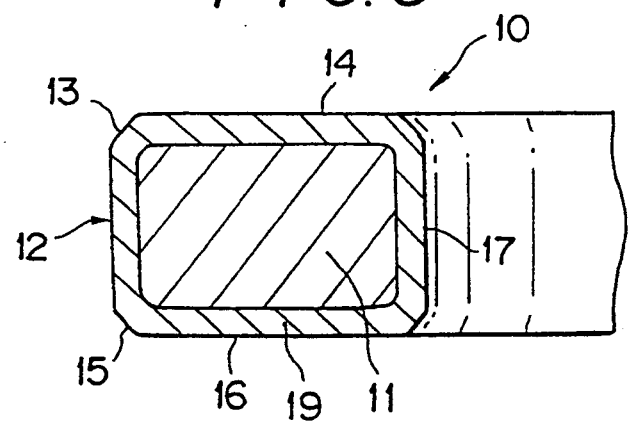
FIG. 6 is a sectional view of the base member in which white layers remaining on all the surfaces of the base member are completely removed.

Furthermore, as shown in FIG. 6, it may be possible to completely remove the white layer 20 remaining on the surfaces 14 and 16 and the corner portions 13 and 15.

In the present embodiment, the white layer 20 is removed by utilizing an acid solution of low density such as H$_2$SO$_4$ or HCl or by a grinding apparatus provided with a grinding stone.

For further understanding of the present invention, experimental examples performed by the inventors of this application will be described hereunder. In the Experiments A to D, an acid chemical solution of low density was utilized for removing the white layer to reduce its thickness to less than 5 μm. Namely, the compression ring was dipped in such acid chemical solution to remove the white layer. Density of the chemical solution to be used, treating temperature and treating time may be considered as factors giving influence on the removal of the white layer, but they will be optionally decided in consideration of workability, safety and cost for effectively reducing the thickness of the white layer to less than 5 μm.

Experiment A

In this Experiment A, a fatigue test was carried out in the following manner and fatigue strength of the piston ring produced according to the present invention was compared with that produced by the prior art manner.

1. Testing Apparatus: Piston ring fatigue testing apparatus.

2. Testing Conditions: Stress applied repeatedly from 0 kg/mm$^2$ to 50 kg/mm$^2$ in H$_2$SO$_4$ solution having pH 3.5 until the piston ring was broken.

3. Test Materials:

a. Conventional Product: Nitriding treatment was carried out to a steel base material of composition including, in percentage by weight (%), C: 0.87, Si: 0.42, Mn: 0.30, Cr: 17.50, Mo: 1.03, V: 0.01 and balance of Fe and inevitable impurity, and a portion of a white layer having hard and brittle property only formed on the sliding surface of the base material was removed and portions of the white layers formed on the corner portions and other surfaces of the base member each had a thickness of about 20 μm.

b. Product of This Invention: Substantially the same nitriding treatment as that carried out to the conventional product was carried out to a steel base material of the composition which is substantially the same as that of the conventional one. Thereafter, the base material was dipped in an acid solution having low density to remove the white layer having very hard and brittle property. The conditions for the removal of the white layer and the remaining amount of the white layer were as follows.

White Layer Removing Conditions

Treating Liquid: $H_2SO_4$ solution
Treating Density: 1.2%
Treating Temperature: 35° C.
Treating Time: 13 min.
Thickness (amount) of Remaining White Layer in Final Product:
Sliding surface: 0 μm,
Upper surface: 0 μm,
Lower surface: 0 μm,
Inner peripheral surface: 0 μm,
Corner portion: 0 μm.

4. Test Result: Test results are shown in the following Table 1, and as shown in Table 1, the product according to the present invention showed fatigue strength more than 10 times in comparison with the conventional product.

TABLE 1

| Test Material | Stress Applying Times | Numbers N of Test Material |
|---|---|---|
| Conventional Product | $2.2 \times 10^5$ $1.1 \times 10^5$ $1.3 \times 10^5$ | N = 3 |
| Product of This Invention | more than $2.6 \times 10^6$ (not broken) | N = 3 |

Experiment B

In this Experiment B, a fatigue test was carried out in the following manner and fatigue strength of the piston ring as a final product produced according to the present invention was compared with that produced by the prior art manner. In this Experiment B, the steel base member of a material different from that of the Experiment A was used.

1. Testing Apparatus: Same as in the Experiment A.
2. Testing Conditions: Same as in the Experiment A.
3. Test Materials:
   a. Conventional Product: nitriding treatment was carried out to a steel base material of composition including, in percentage by weight (%), C: 0.91, Si: 0.30, Mn: 0.29, Cr: 21.63, Mo: 0.30, Ni: 0.99 and balance of Fe and inevitable impurity, and a portion of a white layer having hard and brittle property only formed on the sliding surface of the base material was removed and portions of the white layers formed on the corner portions and other surfaces of the base member each had a thickness of about 20 μm.
   b. Product of This Invention: Substantially the same nitriding treatment as that carried out to the conventional product was carried out to a steel base material of the composition which is substantially the same as that of the conventional one. Thereafter, the base material was dipped in an acid solution having low density to remove the white layer having very hard and brittle property. The conditions for the removal of the white layer and the remaining amount of the white layer were as follows.

White Layer Removing Conditions: All the same as those of the Experiment A.

Thicknesses (amount) of Remaining White Layer in Final Product:
Sliding surface: 0 μm,
Upper surface: 0 μm,
Lower surface: 0 μm,
Inner peripheral surface: 3 μm,
Corner portion: 3 μm.

4. Test Result: Test results are shown in the following Table 2, and as shown in the Table 2, the product according to the present invention showed fatigue strength more than 10 times in comparison with the conventional product.

TABLE 2

| Test Material | Stress Applying Times | Numbers N of Test Material |
|---|---|---|
| Conventional Product | $3.6 \times 10^5$ $2.4 \times 10^5$ $1.3 \times 10^5$ | N = 3 |
| Product of This Invention | more than $2.6 \times 10^6$ (not broken) | N = 3 |

Experiment C

In this Experiment C, a fatigue test was carried out in the following manner and fatigue strength of the piston ring as a final product produced according to the present invention was compared with that produced by the prior art manner. In this Experiment C, substantially the same steel base material as that of the Experiment B was utilized and the testing conditions were changed.

1. Testing Apparatus: Same as in the Experiment A.
2. Testing Conditions: The fatigue strength was obtained from the S-N curve in an air atmosphere.
3. Test Materials:
   a. Conventional Product: Same as that of the Experiment B.
   b. Product of This Invention: Same as that of the Experiment B.

4. Test Result: Test results are shown in the following Table 3. As shown in the Table 3, the product according to the present invention showed fatigue strength more than that of the conventional product.

TABLE 3

| Test Material | Fatigue Strength |
|---|---|
| Conventional Product | 57 kg/mm$^2$ |
| Product of This Invention | 85 kg/mm$^2$ |

Experiment D

Endurance tests were performed to the products produced by the Experiments A and B by applying them to the following test internal combustion engine to confirm presence or absence of broken portions.

1. Test Engine: Water cooled engine (2,800 cc), 4 series Diesel engine.
2. Test Conditions: From idle to 4750 rpm (up/down), 200,000 cycles (about 420 Hr).

3. Test Products:

First Cylinder: Product (1) of present invention of the Experiment B.

Second Cylinder: Conventional product (2) of the Experiment A.

Third Cylinder: Conventional product (3) of the Experiment B.

Fourth Cylinder: Product (4) of present invention of the Experiment A.

4. Test Result: The test results are shown in the following Table 4. As shown in the Table 4, the piston rings as the test products of the second and third cylinders were broken in this Experiment D.

TABLE 4

| Cylinder No. | Test Product | Broken Condition |
| --- | --- | --- |
| 1 | (1) | Not broken |
| 2 | (2) | Broken |
| 3 | (3) | Broken |
| 4 | (4) | Not broken |

As can be seen from the test results of the above Experiments, a remarkably improved fatigue strength could be obtained by the removal of the white layer according to the present embodiment of this invention, and furthermore, the piston rings as products were not be broken during the operation of the engine. Accordingly, it was evidenced that the use of the compression ring according to this invention is remarkably effective particularly for a high revolution and high power type internal combustion engine.

Experiment E

In this Experiment E, the white layer remaining on the corner portions 13 and 15 and the upper and lower surfaces 14 and 16 of the piston ring 10, i.e. compression ring, (FIG. 5, for example) was removed so as to have thickness 5 μm or less by a griding method utilizing a griding stone or bite.

Furthermore, in the Experiment E, the fatigue test was performed in the following manner and the test results were compared between the conventional product and that of the present invention.

1. Testing Apparatus: Same as that in the Experiment A.
2. Test Condition: Same as that in the Experiment A.
3. Test Material:

a. Conventional Product: Same as that in the Experiment B.

b. Product of This Invention: Steel base member (same as that in the Experiment B) was subjected to the nitriding treatment, and the white layers formed on the corner portions and the upper and lower surfaces was removed by utilizing a grinding stone. A wet working method was utilized for the grinding method.

The remaining thicknesses (amount) of the white layers were as follows.

Thickness (amount) of Remaining White Layers in Final Product:

Sliding surface: 0 μm,
Upper surface: 0 μm,
Lower surface: 0 μm,
Inner peripheral surface: 15 μm,
Corner portion: 0 μm.

4. Test Results: Test results are shown in the following Table 5. As shown in the Table 5, the fatigue strength of the product of this invention in comparison with the conventional product was remarkably improved.

TABLE 5

| Test Material | Stress Applying Times | Numbers N of Test Material |
| --- | --- | --- |
| Conventional Product | $3.6 \times 10^5$ | $N = 3$ |
| | $2.4 \times 10^5$ | |
| | $1.3 \times 10^5$ | |
| Product of This Invention | $9.0 \times 10^5$ | $N = 3$ |
| | $1.0 \times 10^6$ | |
| | $1.0 \times 10^6$ | |

As can be seen from the test result of the Experiment E, according to the white layer removing method of this invention, the improved fatigue strength could be obtained. In this case, since the grinding operation was not made to the inner peripheral surface of the base member, the white layer remained unremoved on the inner peripheral surface. However, this is not related at all to the fatigue strength of the piston ring.

Further, in the above experiment, the white layers of the upper and lower surfaces and the corner portions of the piston ring can be completely removed so as to have zero thickness, but such grinding working is excessive in quality control and may involve much working cost. Accordingly, in the practical use, in order to realize the improved fatigue strength with no increase in working costs, it was found to be reasonable to reduce the thickness of the white layer to about 5 μm or less.

As described above and evidenced by experiments, according to this invention, cracks are hardly formed to the white layer formed on the outer surface of the base member of the piston ring (i.e., compression ring), and the fatigue strength of the piston ring can be improved, thus increasing anti breaking property thereof.

What is claimed is:

1. A piston ring adapted to be received by an annular groove formed in a piston disposed in a cylinder assembly of an internal combustion engine, comprising:

an annular ring base member having a cutout portion, the annular ring base member having an outer sliding surface, first and second surfaces continuous to the outer sliding surface through corner portions and an inner peripheral surface to be fitted in the piston groove, the outer sliding surface contacting an inner wall of the cylinder when the piston reciprocates therein; and a nitriding layer formed on all the surfaces of the annular ring base member by a nitriding treatment, said nitriding layer comprising a diffusion layer and a brittle white layer formed on the diffusion layer, wherein a first portion of the brittle white layer which is formed on the sliding surface of the ring base member is substantially completely removed, and a second portion of the brittle white layer which is formed on the first, second and inner peripheral surfaces and the corner portions is at least partially removed so as to reduce a thickness of the second portion to not more than 5 μm.

2. The piston ring of claim 1, wherein the first and second portions of the brittle white layer are removed by dipping the ring base member provided with the nitriding layer into an acid solution of low density.

3. The piston ring of claim 2, wherein the acid solution is $H_2SO_4$.

4. The piston ring of claim 2, wherein the acid solution is HCl.

5. The piston ring of claim 1, wherein the nitriding layer is removed by grinding.

6. The piston ring of claim 1, wherein the piston ring is adapted to be used as a compression ring.

7. A piston ring adapted to be received by an annular groove formed in a piston disposed in a cylinder assembly of an internal combustion engine, consisting essentially of:
- an annular ring base member having a cutout portion, the annular ring base member having an outer sliding surface, first and second surfaces continuous to the outer sliding surface through corner portions and an inner peripheral surface to be fitted in the piston groove, the outer sliding surface contacting an inner wall of the cylinder when the piston reciprocates therein; and
- a nitriding layer formed on all the surfaces of the annular ring base member by a nitriding treatment, said nitriding layer comprising a diffusion layer and a brittle white layer formed on the diffusion layer, wherein a first portion of the brittle white layer which is formed on the sliding surface of the ring base member is substantially completely removed, and a second portion of the brittle white layer formed on the first, second and inner peripheral surfaces and the corner portions is at least partially removed so as to reduce a thickness of said portion to not more than 5 $\mu$m.

8. A piston ring adapted to be received by an annular groove formed in a piston disposed in a cylinder assembly of an internal combustion engine, comprising:
- an annular ring base member having a cutout portion, the annular ring base member having an outer sliding surface, first and second surfaces continuous to the outer sliding surface through corner portions and an inner peripheral surface to be fitted in the piston groove, the outer sliding surface contacting an inner wall of the cylinder when the piston reciprocates therein; and
- a nitriding layer formed on all the surfaces of the annular ring base member by a nitriding treatment, said nitriding layer comprising a diffusion layer and a brittle white layer formed on the diffusion layer, said brittle white layer being present and being disposed only along said first, second and inner peripheral surfaces and corner portions such that said outer sliding surface is substantially completely free of said brittle white layer, said brittle white layer having a thickness of not more than 5 $\mu$m.

* * * * *